(12) United States Patent
Morimoto et al.

(10) Patent No.: US 8,269,441 B2
(45) Date of Patent: Sep. 18, 2012

(54) MOTOR CONTROL APPARATUS

(75) Inventors: Shinya Morimoto, Kitakyushu (JP); Mamoru Takaki, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 280 days.

(21) Appl. No.: 12/779,900

(22) Filed: May 13, 2010

(65) Prior Publication Data

US 2010/0219780 A1 Sep. 2, 2010

Related U.S. Application Data

(63) Continuation of application No. PCT/JP2008/070169, filed on Nov. 6, 2008.

(30) Foreign Application Priority Data

Nov. 15, 2007 (JP) .................................. 2007-296988

(51) Int. Cl.
   *H02P 23/12* (2006.01)
(52) U.S. Cl. ............... 318/400.14; 318/400.02; 318/801
(58) Field of Classification Search ............. 318/400.14, 318/400.02, 801, 432, 717, 721
   See application file for complete search history.

(56) References Cited

U.S. PATENT DOCUMENTS

| | | | |
|---|---|---|---|
| 2005/0075766 | A1 | 4/2005 | Kobayashi et al. |
| 2007/0170885 | A1 | 7/2007 | Morimoto et al. |
| 2007/0216342 | A1 | 9/2007 | Tobari et al. |
| 2007/0241715 | A1 | 10/2007 | Fujiwara et al. |
| 2008/0030163 | A1 * | 2/2008 | Fukuchi et al. ............... 318/801 |

FOREIGN PATENT DOCUMENTS

| | | |
|---|---|---|
| JP | 2003-209996 | 7/2003 |
| JP | 2004-215320 | 7/2004 |
| JP | WO 2005-088822 | 9/2005 |
| JP | 2006-254572 | 9/2006 |
| JP | 2007-228744 | 9/2007 |
| JP | 2007-252052 | 9/2007 |
| JP | 2007-274844 | 10/2007 |

OTHER PUBLICATIONS

International Search Report for International Application No. PCT/JP2008/070169.
Written Opinion of the International Searching Authority for International Application No. PCT/JP2008/070169.
Umekomijishaku douki motor no sekkeito seigyo Oct. 25, 2001, p. 26-p. 27, Ohmsha.
Bae et al. New Field Weakening Technique for High Saliency Interior Permanent Magnet Motor IEEE, 2003, 0-7803-0/03.

* cited by examiner

*Primary Examiner* — Karen Masih
(74) *Attorney, Agent, or Firm* — Ditthavong Mori & Steiner, P.C.

(57) ABSTRACT

A motor control apparatus includes a current control unit which is configured to calculate dq-axis voltage commands to match d-axis and q-axis current commands with d-axis and q-axis currents of a motor current, respectively. A power conversion circuit is configured to drive the motor. A modulation factor command unit is configured to determine a modulation factor command. A modulation wave command unit is configured to determine modulation wave commands. A pulse width modulation generating unit is configured to generate a pulse width modulation pattern. A modulation factor saturation level calculating unit is configured to determine a modulation factor saturation level. A field-weakening control unit is configured to correct the d-axis current command.

11 Claims, 9 Drawing Sheets

MOTOR CONTROL APPARATUS

CROSS REFERENCES TO RELATED APPLICATIONS

The present application is a continuation application of International Application No. PCT/JP2008/070169, filed Nov. 6, 2008, which claims priority to Japanese Patent Application No. 2007-296988, filed Nov. 15, 2007. The contents of these applications are incorporated herein by reference in their entirety.

BACKGROUND OF THE INVENTION

1. Field of the Invention

The present invention relates to a motor control apparatus.

2. Description of Related Art

Japanese Unexamined Patent Application Publication No. 2006-254572 proposes a method that determines $V^*_{qmax}$ in equation (1) using a maximum voltage $V_{max}$ and a d-axis voltage command $V_d^*$, and determines a difference between the $V^*_{qmax}$ and a q-axis voltage command to perform proportional integral (PI) control and correct a d-axis current command:

$$V^*_{qmax} = \sqrt{V_{max}^2 - V_d^{*2}} \quad (1)$$

SUMMARY OF THE INVENTION

According to one aspect of the present invention, a motor control apparatus includes a current control unit, a power conversion circuit, a modulation factor command unit, a modulation wave command unit, a pulse width modulation generating unit, a modulation factor saturation level calculating unit, and a field-weakening control unit. The current control unit is configured to calculate dq-axis voltage commands in a dq coordinate system based on a motor magnetic pole position to match a d-axis current command and a q-axis current command obtained based on a torque command with a d-axis current and a q-axis current of a motor current, respectively. The power conversion circuit is configured to drive the motor based on the dq-axis voltage commands. The modulation factor command unit is configured to determine a modulation factor command based on the dq-axis voltage commands and a direct current bus voltage of the power conversion circuit. The modulation wave command unit is configured to determine modulation wave commands using the modulation factor command. The pulse width modulation generating unit is configured to generate a pulse width modulation pattern based on the modulation wave commands and a pulse width modulation carrier signal. The modulation factor saturation level calculating unit is configured to determine a modulation factor saturation level based on the modulation factor command and a limit value. The field-weakening control unit is configured to correct the d-axis current command based on the modulation factor saturation level.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
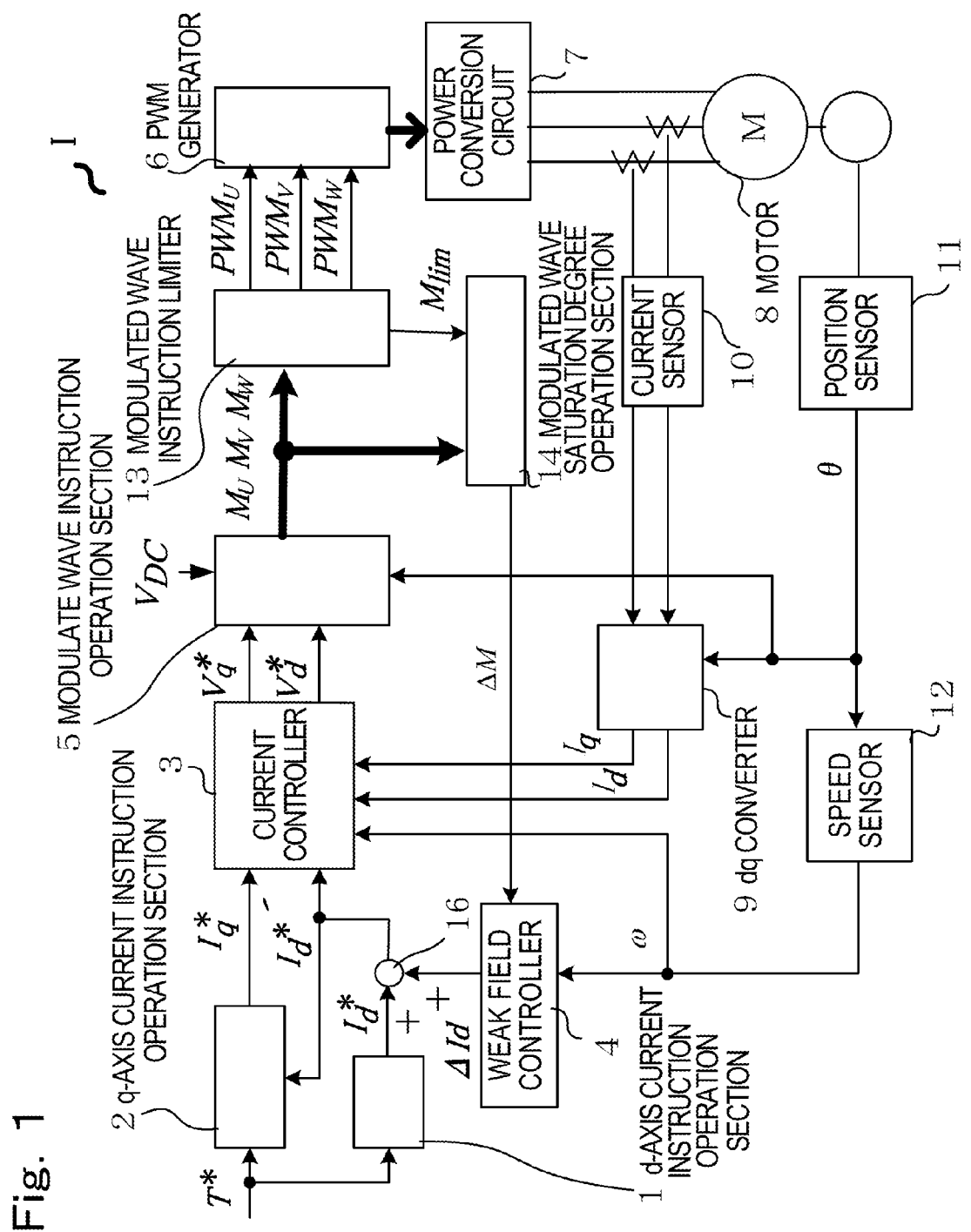
FIG. 1 is a block diagram of a motor control apparatus according to a first embodiment of the present invention.

Embodiments of the present invention will now be described with reference to the accompanying drawings, wherein like reference numerals designate corresponding or identical elements throughout the various drawings.

FIG. 1 is a block diagram of a motor control apparatus I according to a first embodiment of the present invention.

The motor control apparatus I includes a d-axis current command calculating unit 1, a q-axis current command calculating unit 2, and a current control unit 3. The d-axis current command calculating unit 1 inputs a given torque command T* to calculate a d-axis current command $I_d^*$ based on motor characteristics. The q-axis current command calculating unit 2 inputs the torque command T* and a corrected d-axis current command $I_d^{*'}$ (described below) to calculate a q-axis current command $I_q^*$. The current control unit 3 determines dq-axis voltage commands ($V_d^*, V_q^*$) such that the corrected d-axis current command $I_d^{*'}$ and the q-axis current command $I_q^*$ agree with detected dq-axis currents ($I_d, I_q$), respectively.

The motor control apparatus I further includes a field-weakening control unit 4 that determines the amount of correction $\Delta I_d$ of the d-axis current command $I_d^*$ from a modulation factor saturation level $\Delta M$ (described below), a modulation factor command unit 5, a modulation wave command unit 13, a PWM generating unit 6 that outputs a switching command to a power conversion circuit unit 7.

The motor control apparatus I further includes a switching element that performs switching in accordance with modulation wave commands ($PWM_U$, $PWM_V$, $PWM_W$), the power conversion circuit unit 7 that converts a DC bus voltage $V_{DC}$ into an alternating voltage to supply power to a motor 8, the motor 8 that is a three-phase IPMSM, and a dq conversion unit 9 that determines the dq-axis currents ($I_d, I_q$) using motor phase currents and a motor magnetic pole position θ of the motor 8.

The motor control apparatus I further includes a current detecting unit 10 that detects motor phase currents, a position detecting unit 11 that detects the motor magnetic pole position θ, and a speed detecting unit 12 that calculates a motor speed ω from the motor magnetic pole position θ.

The motor control apparatus I further includes a modulation factor saturation level calculating unit 14 (described below), and an adder 16 that adds the amount of correction $\Delta I_d$ of the d-axis current command $I_d^*$ to the d-axis current command $I_d^*$ to generate the corrected d-axis current command $I_d^{*\prime}$.

The motor control apparatus I performs motor control in a dq coordinate system where a magnetic flux direction of the motor 8 is a d axis. The current control unit 3 may be capable of performing voltage feedforward compensation that uses information such as the motor speed ω and the dq-axis currents ($I_d$, $I_q$) to mainly determine interference terms and counter-electromotive voltages of the dq axes, and adds the determined interference terms and counter-electromotive voltages to the output of the current control unit 3 to determine the dq axis voltage commands ($V_d^*$, $V_q^*$).

Next, a method for determining the modulation wave commands ($PWM_U$, $PWM_V$, $PWM_W$) and the modulation factor saturation level ΔM will be described with reference to FIG. 2.

Figure 2:
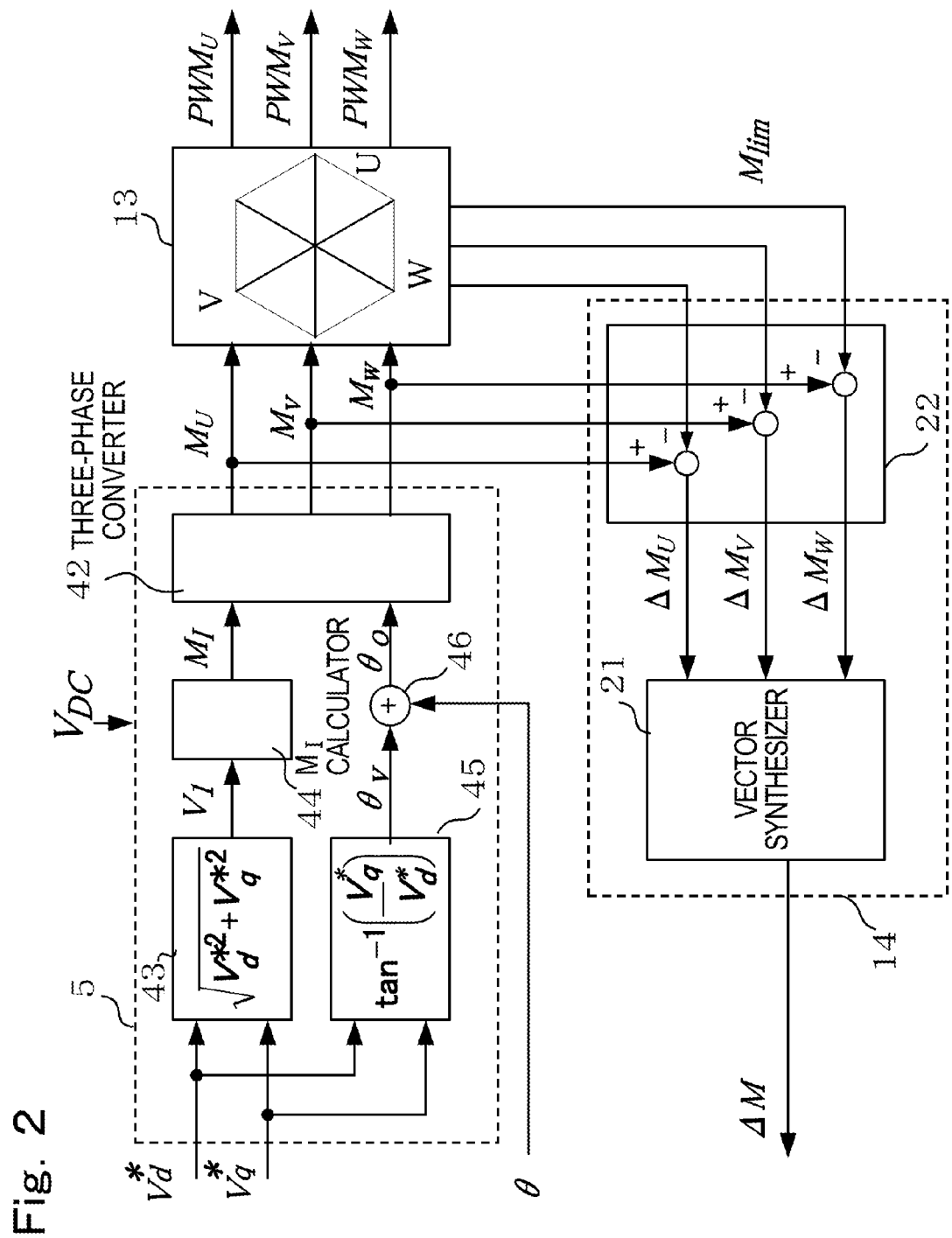
FIG. 2 is a control block diagram illustrating a modulation factor command unit, a modulation wave command unit, and a modulation factor saturation level calculating unit according to the first embodiment.

FIG. 2 is a control block diagram illustrating the modulation factor command unit 5, the modulation wave command unit 13, and the modulation factor saturation level calculating unit 14 according to the first embodiment.

The modulation factor command unit 5 includes a $V_1$ calculator 43, an $M_I$ calculator 44, a $\theta_V$ calculator 45, an adder 46, and a three-phase conversion unit 42. The modulation factor command unit 5 determines a modulation factor command $M_I$ from the dq-axis voltage commands ($V_d^*$, $V_q^*$), the motor magnetic pole position θ, and the DC bus voltage $V_{DC}$ of the power conversion circuit unit 7, the DC bus voltage $V_{DC}$ being detected by a voltage detector (not shown). The modulation factor command unit 5 uses the modulation factor command $M_I$ to determine three-phase modulation factor commands ($M_U$, $M_V$, $M_W$).

The $V_1$ calculator 43 determines a magnitude $V_1$ of the dq-axis voltage commands ($V_d^*$, $V_q^*$). The $M_I$ calculator 44 determines the modulation factor command $M_I$ from the magnitude V1 and the DC bus voltage $V_{DC}$. When the dq-axis voltage commands ($V_d^*$, $V_q^*$) are effective values, the calculations performed by the $V_1$ calculator 43 and the $M_I$ calculator 44 can be expressed by equations (2):

$$V_1 = \sqrt{V_d^{*2} + V_q^{*2}} \qquad (2)$$

$$M_I = V_1 \times \frac{\sqrt{2}}{V_{DC}} \times \frac{2}{\sqrt{3}}$$

where a modulation factor in the case when an output can be obtained without distortion by a sine wave modulation command (i.e., when the maximum value of a sine wave agrees with the maximum value of the DC bus voltage $V_{DC}$) is defined as one.

The $\theta_V$ calculator 45 determines a voltage phase $\theta_V$ of the dq-axis voltage commands ($V_d^*$, $V_q^*$). The adder 46 adds the motor magnetic pole position θ to the voltage phase $\theta_V$ to determine an output phase $\theta_O$. The three-phase conversion unit 42 uses the modulation factor command $M_I$ obtained by equations (2) to determine the three-phase modulation factor commands ($M_U$, $M_V$, $M_W$). These calculations are performed, for example, by solving equations (3):

$$\theta_V = \tan^{-1}\left[\frac{V_q^*}{V_d^*}\right] \qquad (3)$$

-continued $$\theta_o = \theta + \theta_V$$

$$M_U = M_I \times \left\{\cos\theta_o - \frac{1}{6}\cos 3\theta_o\right\}$$

$$M_V = M_I \times \left\{\cos\left(\theta_o - \frac{2\pi}{3}\right) - \frac{1}{6}\cos 3\theta_o\right\}$$

$$M_W = M_I \times \left\{\cos\left(\theta_o + \frac{2\pi}{3}\right) - \frac{1}{6}\cos 3\theta_o\right\}$$

equations (3), a cos $3\theta_O$ term is a third-order harmonic term. By adding the third-order harmonic term, it is possible to make the best use of the DC bus voltage $V_{DC}$. A method of how the third-order harmonic is to be superimposed on what type of waveform, and a method of conversion into three phases are not limited to those described above.

Examples of methods of conversion into the three-phase modulation factor commands ($M_U$, $M_V$, $M_W$) include a triangular wave comparison PWM method and a space vector method. In the triangular wave comparison PWM method, it is advantageous to use equations (3) in calculations. However, the equations are not limited to equations (3).

As is known, since the amplitude of a PWM pulse depends on the DC bus voltage $V_{DC}$, a voltage that can be generated by the motor control apparatus I is also changed by the DC bus voltage $V_{DC}$. The motor control apparatus I may perform calculations on the basis of a specified voltage. In this case, due to voltage fluctuations etc., an input source voltage of the motor control apparatus I does not agree with an output voltage command in practice. Then, the responsivity of current control becomes different from that expected. As a result, with speed sensorless control in which a motor state estimator using an output voltage command is used, it becomes difficult to estimate a motor speed with accuracy. Therefore, for calculations based on a specified voltage, the modulation factor command $M_I$ may be determined from the DC bus voltage $V_{DC}$, for example, by equations (4):

$$V_{1\%} = \sqrt{V_{d\%}^{*2} + V_{q\%}^{*2}} \qquad (4)$$

$$M_I = V_{1\%} \times \frac{V_{rate}\sqrt{2}}{V_{DC}} \times \frac{2}{\sqrt{3}}$$

where $V_{d\%}^*$ and $V_{q\%}^*$ denote dq-axis voltage commands of a specified voltage reference, and $V_{rate}$ denotes a specified voltage.

The modulation factor command $M_I$ and the three-phase modulation factor commands ($M_U$, $M_V$, $M_W$) are thus determined.

The modulation wave command unit 13 limits the three-phase modulation factor commands ($M_U$, $M_V$, $M_W$) to values between a maximum value and a minimum value of a PWM carrier signal, so as to determine the modulation wave commands ($PWM_U$, $PWM_V$, $PWM_W$).

Thus, the modulation wave commands ($PWM_U$, $PWM_V$, $PWM_W$), which can be actually output, are output to the PWM generating unit 6.

The modulation factor saturation level calculating unit 14 includes a vector synthesizing unit 21 and a subtracter 22. The modulation factor saturation level calculating unit 14 inputs the three-phase modulation factor commands ($M_U$, $M_V$, $M_W$) and modulation wave limit values used in the modulation wave command unit 13, that is, the maximum and minimum values of carrier signals to calculate the modulation factor saturation level ΔM. Then, the modulation factor saturation level calculating unit 14 outputs the modulation factor saturation level ΔM to the field-weakening control unit 4.

For each of three phases (U, V, W), there are two limit values, a maximum value and a minimum value. The subtracter 22 compares the two limit values with each of the three-phase modulation factor commands ($M_U$, $M_V$, $M_W$), and uses the nearer of the two limit values to determine each of difference values ($\Delta M_U$, $\Delta M_V$, $\Delta M_W$). FIG. 2 shows that the nearer of the two limit values is output as a limit value Mlim from the modulation wave command unit 13 for each of the three phases.

The vector synthesizing unit 21 uses, for example, equations (5), which involve a three-phase to two-phase transformation and a square and square root calculation, to vector-synthesize the difference values ($\Delta M_U$, $\Delta M_V$, $\Delta M_W$) and determine the modulation factor saturation level ΔM:

$$\begin{bmatrix} \Delta M_\alpha \\ \Delta M_\beta \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} \Delta M_U \\ \Delta M_V \\ \Delta M_W \end{bmatrix} \tag{5}$$

$$\Delta M = \sqrt{\Delta M_\alpha^2 + \Delta M_\beta^2}$$

The modulation factor saturation level ΔM is thus calculated.

Next, the field-weakening control unit 4 will be described with reference to FIG. 3.

Figure 3:
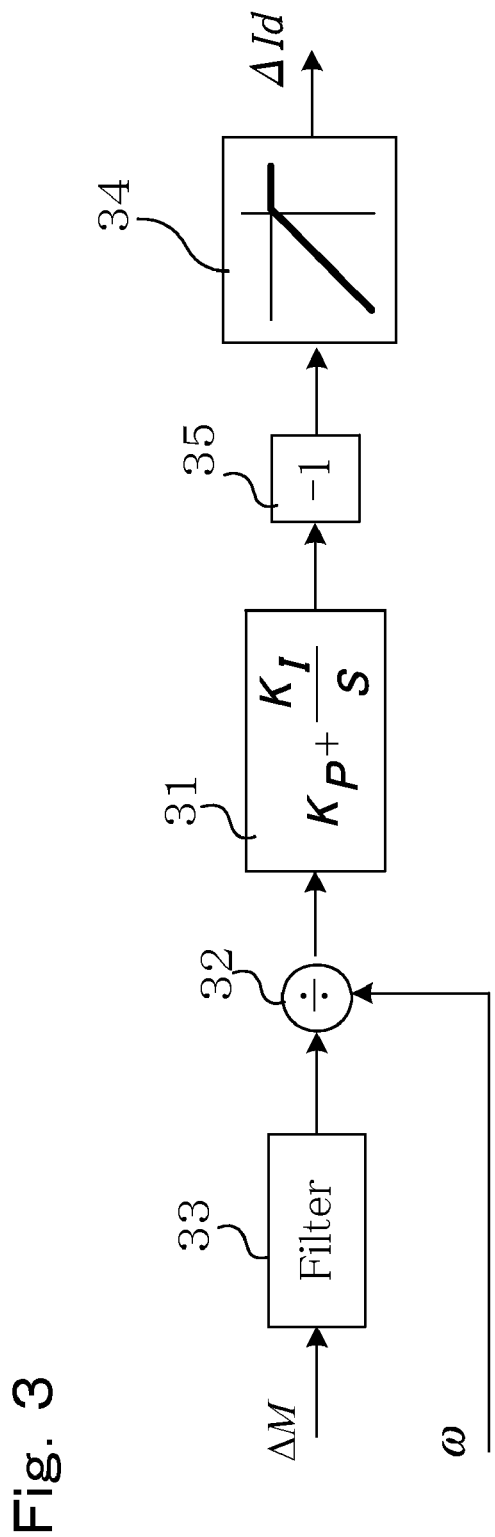
FIG. 3 is a control block diagram illustrating a field-weakening control unit according to the first embodiment.

FIG. 3 is a control block diagram illustrating the field-weakening control unit 4 according to the first embodiment.

The field-weakening control unit 4 includes a PI control unit 31, a divider 32, a filter 33, a limiter 34, and a sign inverter 35. The field-weakening control unit 4 inputs the modulation factor saturation level ΔM and the motor speed ω to determine the amount of d-axis current correction $\Delta I_d$.

The filter 33 is for eliminating, when a modulation factor increases, high-frequency components contained in a modulation wave in an overmodulation region (where a modulation factor to be output is 2/√3 or more) or in six steps (where a modulation factor to be output is about 4/π. For example, a first-order lag filter is used as the filter 33.

The divider 32 divides, by the motor speed ω, the modulation factor saturation level ΔM passed through the filter 33. The PI control unit 31 performs a PI control calculation such that the output of the divider 32 becomes zero. The sign inverter 35 inverts a sign of the output of the PI control unit 31 to determine the amount of d-axis current correction $\Delta I_d$. The PI control unit 31 may perform only one of integral (I) control and proportional (P) control.

To enable correction only in the direction in which the field is weakened, the limiter 34 limits the positive side of the amount of d-axis current correction $\Delta I_d$ to zero.

Thus, the field-weakening control unit 4, except the filter 33 and the limiter 34, performs the calculation of equation (6):

$$\Delta I_d = -\left[K_P + \frac{K_I}{s}\right]\frac{\Delta M}{\omega} \tag{6}$$

where $K_p$ denotes a proportional gain, $K_i$ denotes an integration gain, and S denotes a Laplace operator S.

Next, a method for adjusting the proportional gain $K_p$ and the integration gain $K_i$ in equation (6) will be briefly described.

Since the field-weakening control is for adjusting the motor current so as to control the output voltage, the response characteristics of the field-weakening control can be determined from a relationship between the motor voltage and the motor current. Therefore, in a PI control calculation where the modulation factor saturation level ΔM is an input value, the response may be changed by fluctuations in the DC bus voltage $V_{DC}$. To eliminate the effect of the fluctuations, each gain may be corrected using the DC bus voltage $V_{DC}$, as shown in equations (7), such that the specified voltage $V_{rate}$ becomes a reference value:

$$K'_P = K_P \times \frac{V_{DC}}{V_{rate}\sqrt{2}} \tag{7}$$

$$K'_I = K_I \times \frac{V_{DC}}{V_{rate}\sqrt{2}}$$

Thus, since a modulation factor can be converted to be expressed in voltage, it is possible to achieve response characteristics that are not affected by fluctuations in the DC bus voltage $V_{DC}$.

The motor control apparatus I according to the first embodiment of the present invention is configured as described above. The motor control apparatus I properly performs field-weakening control while outputting consistently at the maximum modulation factor. This can make the field-weakening current smaller than before and thus can make it possible to improve efficiency.

Figure 4:
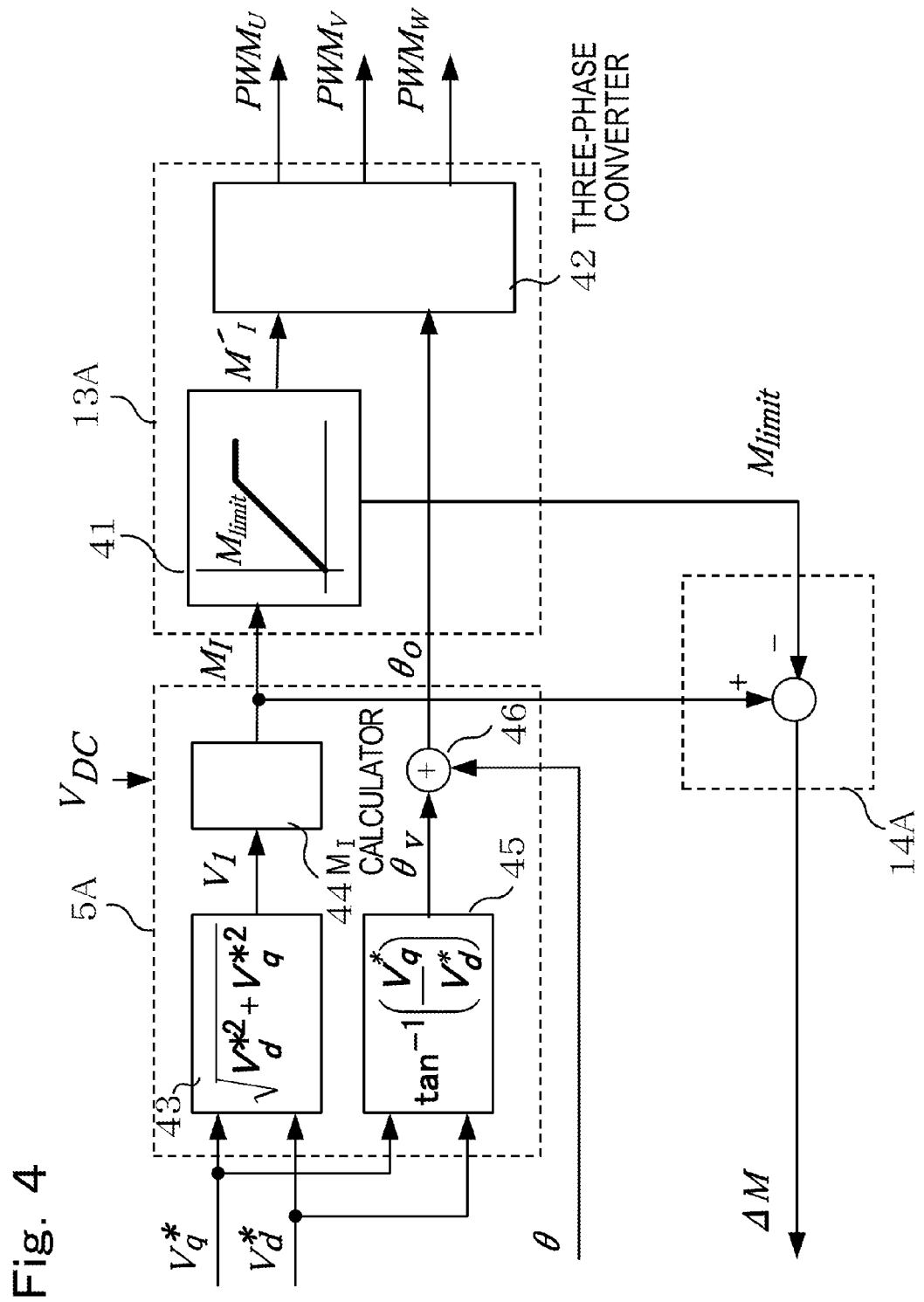
FIG. 4 is a control block diagram illustrating a modulation factor command unit, a modulation wave command unit, and a modulation factor saturation level calculating unit according to a second embodiment of the present invention.

FIG. 4 is a control block diagram illustrating a modulation factor command unit 5A, a modulation wave command unit 13A, and a modulation factor saturation level calculating unit 14A according to a second embodiment of the present invention.

The modulation factor command unit 5A performs calculations similar to those performed by the modulation factor command unit 5 of FIG. 2 to determine the modulation factor command $M_I$ and the output phase $\theta_O$, and outputs them.

The modulation wave command unit 13A includes a modulation factor limiting unit 41 and the three-phase conversion unit 42. The modulation factor limiting unit 41 limits the modulation factor command $M_I$ to a predetermined modulation factor limit value $M_{limit}$ to determine a modulation factor command $M'_I$. The modulation factor limit value $M_{limit}$ is a value determined on the basis of an allowable range of output harmonics in an application to which the motor control apparatus I is applied. The modulation factor limiting unit 41 outputs the modulation factor command $M'_I$ and the modulation factor limit value $M_{limit}$ to the three-phase conversion unit 42 and the modulation factor saturation level calculating unit 14A, respectively.

The three-phase conversion unit 42 uses the modulation factor command $M'_I$ and the output phase $\theta_O$ to determine the three-phase modulation factor commands ($M_U$, $M_V$, $M_W$), for example, in equations (8):

$$M_U = M'_I \times \left\{\cos\theta_o - \frac{1}{6}\cos 3\theta_o\right\} \tag{8}$$

$$M_V = M'_I \times \left\{\cos\left(\theta_o - \frac{2\pi}{3}\right) - \frac{1}{6}\cos 3\theta_o\right\}$$

-continued $$M_W = M'_I \times \left\{ \cos\left(\theta_o + \frac{2\pi}{3}\right) - \frac{1}{6}\cos 3\theta_o \right\}$$

As necessary, the three-phase conversion unit 42 limits each of the three-phase modulation factor commands ($M_U$, $M_V$, $M_W$) with the maximum and minimum values of a carrier signal to determine the modulation wave commands ($PWM_U$, $PWM_V$, $PWM_W$).

As described in the first embodiment, there are various other methods for determining a modulation wave. The second embodiment is the same as the first embodiment in that any of the other methods may be used.

The modulation factor saturation level calculating unit 14A is configured as a subtracter that subtracts the modulation factor limit value $M_{limit}$ from the modulation factor command $M_I$ to determine the modulation factor saturation level $\Delta M$.

The modulation factor saturation level $\Delta M$ is thus calculated.

As described above, the calculation of the modulation factor saturation level $\Delta M$ is simplified. Additionally, unlike in the case where a modulation factor is limited in each phase, there is no change in limit value depending on the output phase $\theta_O$. Therefore, it is possible to reduce distortion components contained in the amount of modulation factor saturation in an overmodulation region where the modulation factor exceeds $2/\sqrt{3}$.

Figure 5:
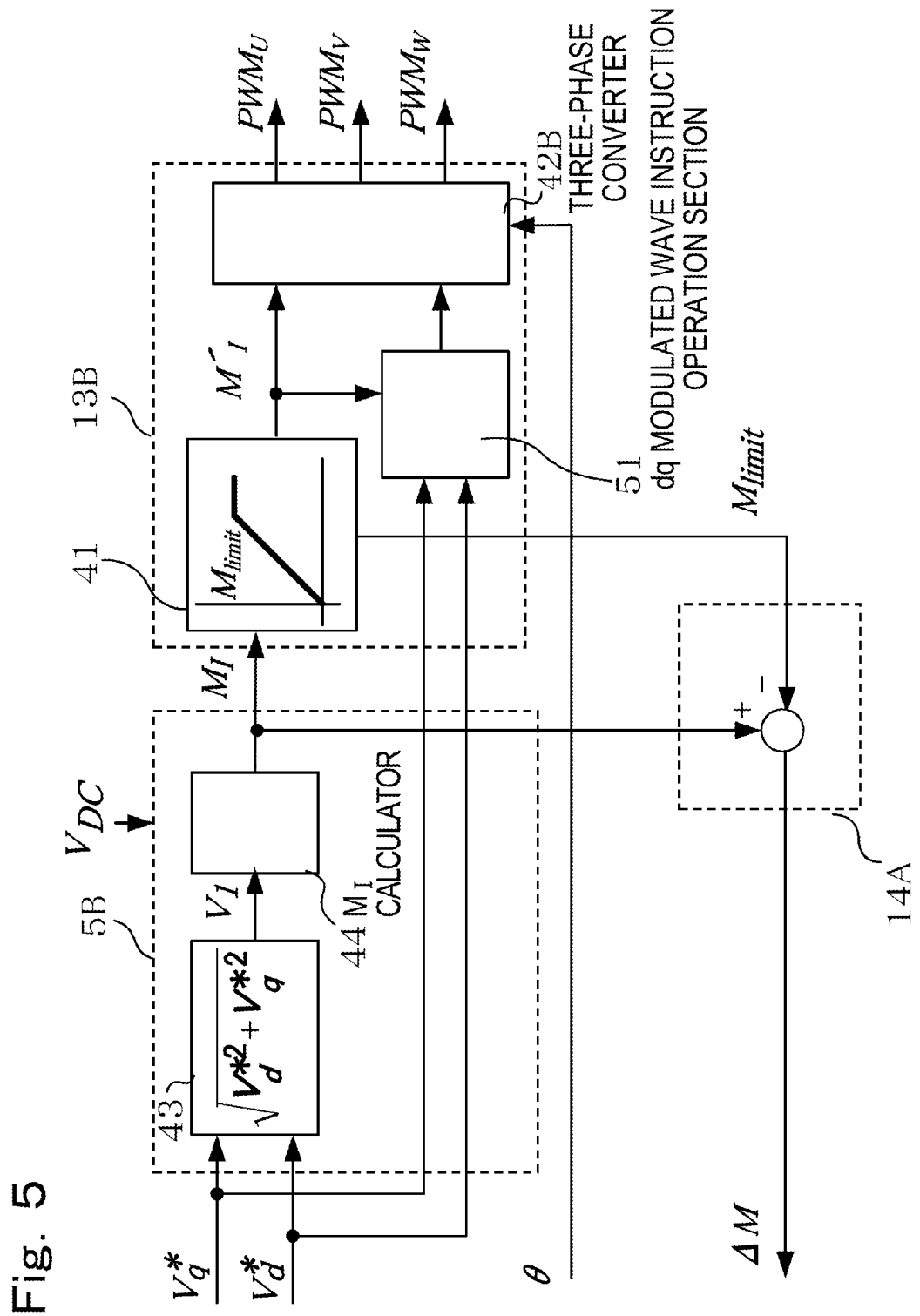
FIG. 5 is a control block diagram illustrating a modulation factor command unit, a modulation wave command unit, and a modulation factor saturation level calculating unit according to a third embodiment of the present invention.

FIG. 5 is a control block diagram illustrating a modulation factor command unit 5B, a modulation wave command unit 13B, and the modulation factor saturation level calculating unit 14A according to a third embodiment of the present invention.

The modulation factor command unit 5B performs calculations similar to those performed by the modulation factor command unit 5A of FIG. 4 to output the modulation factor command $M_I$.

The modulation wave command unit 13B includes the modulation factor limiting unit 41, a three-phase conversion unit 42B, and a dq modulation factor command unit 51. The modulation factor limiting unit 41 performs the same process as that performed by the modulation factor limiting unit 41 of FIG. 4, so as to determine the modulation factor command $M'_I$. The dq modulation factor command unit 51 uses the modulation factor command $M'_I$ and the dq-axis voltage commands ($V_d^*$, $V_q^*$) to determine dq-axis modulation factor commands ($M_d$, $M_q$) in equations (9):

$$V_1 = \sqrt{V_d^{*2} + V_q^{*2}} \tag{9}$$

$$M_d = \frac{M'_I}{V_1} \times V_d$$

$$M_q = \frac{M'_I}{V_1} \times V_q$$

In equations (9), the calculation of $V_1$ can be simplified by using a value obtained by the modulation factor command unit 5B to determine the modulation factor command $M_I$.

The three-phase conversion unit 42B uses, for example, equation (10) to convert the dq-axis modulation factor commands ($M_d$, $M_q$) into the three-phase modulation factor commands ($M_U$, $M_V$, $M_W$):

$$\begin{bmatrix} M_U \\ M_V \\ M_W \end{bmatrix} = \begin{bmatrix} \cos\theta & -\sin\theta \\ \cos\left(\theta - \frac{2\pi}{3}\right) & -\sin\left(\theta - \frac{2\pi}{3}\right) \\ \cos\left(\theta + \frac{2\pi}{3}\right) & -\sin\left(\theta + \frac{2\pi}{3}\right) \end{bmatrix} \begin{bmatrix} M_d \\ M_q \end{bmatrix} \tag{10}$$

As necessary, the three-phase conversion unit 42B limits each of the three-phase modulation factor commands ($M_U$, $M_V$, $M_W$) with the maximum and minimum values of a carrier signal to determine the modulation wave commands ($PWM_U$, $PWM_V$, $PWM_W$).

The same result can be obtained when the modulation factor command $M_W$ is expressed as $-M_U-M_V$ ($M_W=-M_U-M_V$). However, since this results in a sine wave output, an output voltage is distorted when a modulation factor exceeds one. Examples of proposed methods for correcting this problem include a method in which correction is performed such that a space vector output is obtained, and a method in which the same value is added to each phase such that the maximum value or the minimum value of the three phases does not exceed the limit value of the output of each phase. Using such methods makes it possible to obtain an output without distortion until the modulation factor reaches $2/\sqrt{3}$.

The modulation factor saturation level calculating unit 14A performs the same process as that performed by the modulation factor saturation level calculating unit 14A of FIG. 4 to determine the modulation factor saturation level $\Delta M$.

The modulation factor saturation level $\Delta M$ is thus calculated.

Since the same process as that of the second embodiment can be done without performing a $\tan^{-1}$ calculation, it is possible to reduce calculation time.

Figure 6:
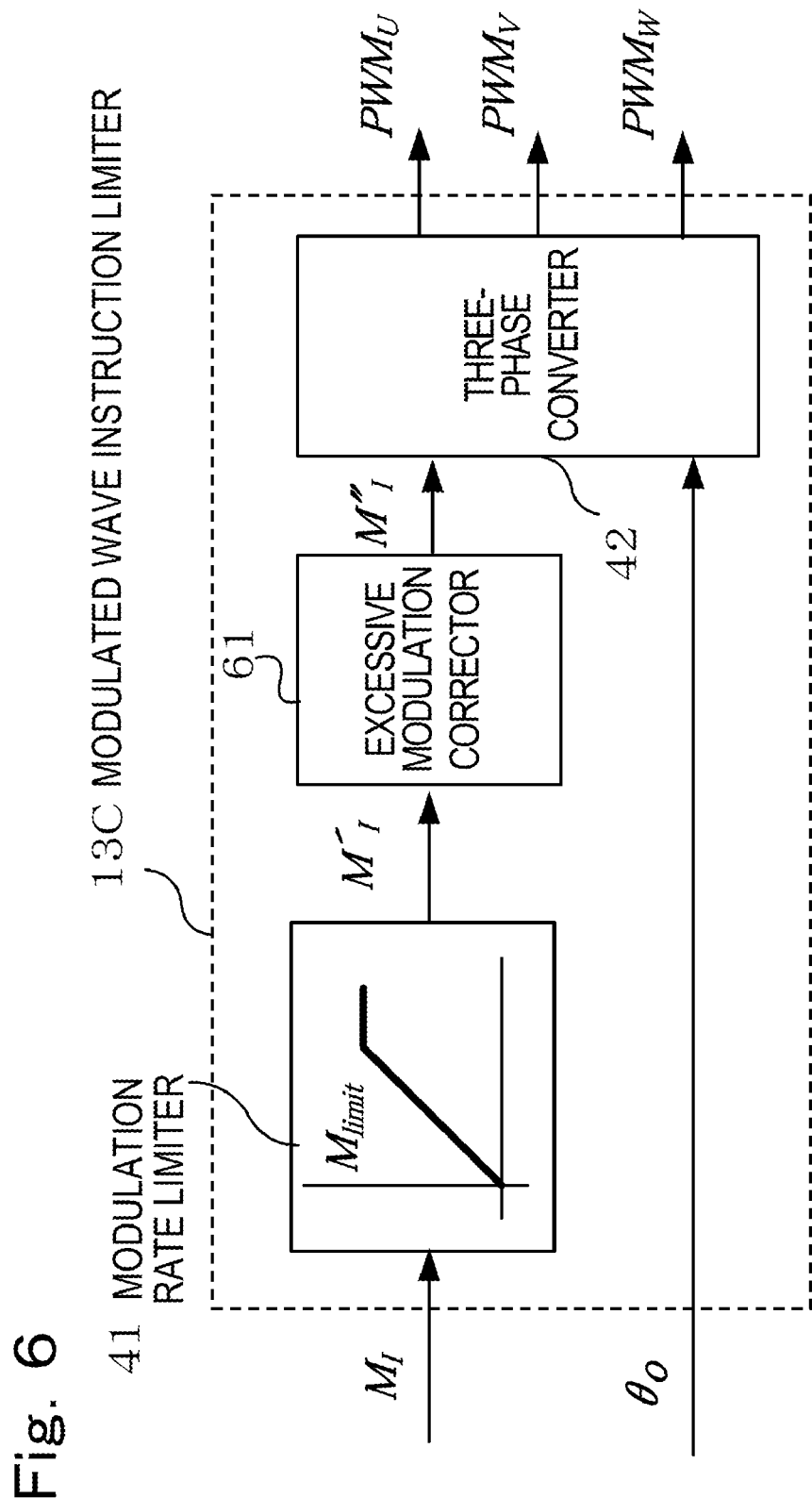
FIG. 6 is a control block diagram illustrating a modulation wave command unit according to a fourth embodiment of the present invention.

FIG. 6 is a control block diagram illustrating a modulation wave command unit 13C according to a fourth embodiment of the present invention. The modulation wave command unit 13C is obtained by adding an overmodulation correcting unit 61 to the modulation wave command unit 13A illustrated by the block diagram of FIG. 4.

Figure 7:
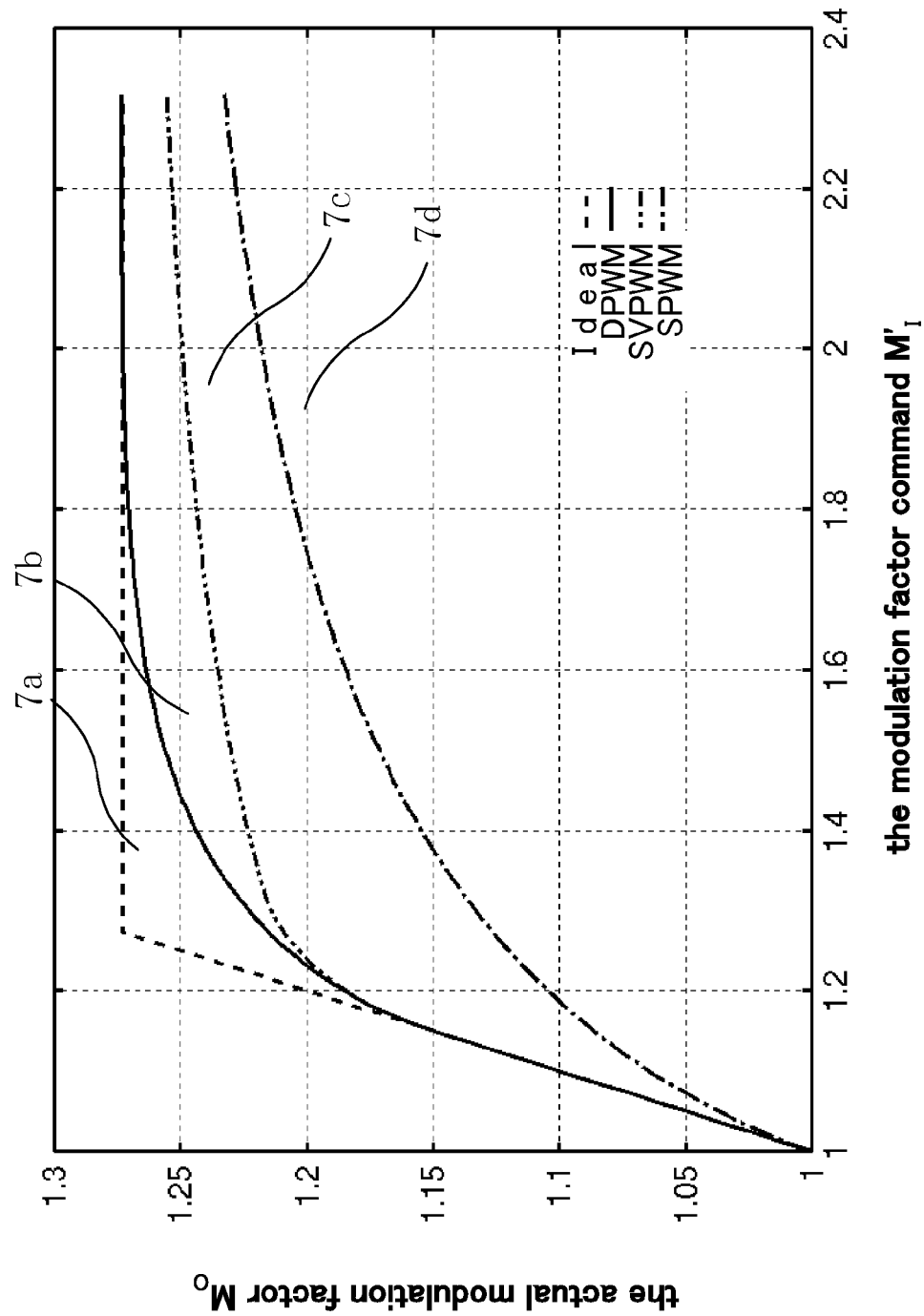
FIG. 7 shows a relationship between a modulation factor command and an actual modulation factor.

FIG. 7 shows a relationship between the modulation factor command $M'_I$ and the actual modulation factor $M_O$.

In FIG. 7, "7a" indicates an ideal value of a modulation factor command, "7b" indicates a modulation factor in a digital pulse width modulation (DPWM) method, "7c" indicates a modulation factor in a space vector pulse width modulation (SVPWM) method, and "7d" indicates a modulation factor in a sinusoidal pulse width modulation (SPWM) method. As can be seen from FIG. 7, the actual modulation factor $M_O$ for the same modulation factor command $M'_I$ varies depending on the modulation method. The modulation factor 7d (SPWM method) deviates from the ideal value 7a in a region where the modulation factor command is 1 or more, while the modulation factor 7b (DPWM method) and the modulation factor 7c (SVPWM method) deviate from the ideal value 7a in a region where the modulation factor command is $2/\sqrt{3}$ or more. This is caused by distortion in output voltage. In these regions, the saturation level of modulation factor is excessively high, so that the response of the field-weakening control unit 4 is degraded.

The relationship between the modulation factor command $M'_I$ and the actual modulation factor $M_O$ can be generalized as expressed in equation (11):

$$M_O = G(M'_I) \tag{11}$$

Here, an inverse function $G^{-1}( )$ of the $G( )$ function in equation (11) is defined. Then, as shown in equation (12), the modulation factor command $M'_I$ is used as an input to determine a corrected modulation factor command $M''_I$. Thus, the modulation factor command $M'_I$ can agree with the actual modulation factor $M_O$:

$$M''_I = G^{-1}(M'_I) \tag{12}$$

The calculation can be simplified by expressing the inverse function $G^{-1}(\ )$ as a table.

Referring back to FIG. 6, the modulation factor limiting unit 41 limits the modulation factor command $M_I$ to a value smaller than or equal to a modulation factor that can be output, as described with reference to FIG. 7 (e.g., $4/\pi$), and outputs the modulation factor command $M'_I$. The overmodulation correcting unit 61 corrects the modulation factor command $M'_I$ in equation (12) described above to determine $M''_I$.

In three-phase conversion equations on which the overmodulation correcting unit 61 is based, that is, in equations obtained by replacing $M'_I$ in equations (8) with $M''_I$, the three-phase conversion unit 42 determines the three-phase modulation factor commands ($M_U$, $M_V$, $M_W$). As necessary, the three-phase conversion unit 42 limits each of the three-phase modulation factor commands ($M_U$, $M_V$, $M_W$) with the maximum and minimum values of a carrier signal to determine the modulation wave commands ($PWM_U$, $PWM_V$, $PWM_W$).

Thus, the modulation factor command $M'_I$ can agree with the actual modulation factor $M_O$.

Alternatively, an offset may be added to each of the three-phase modulation factor commands. In this method, which is not shown, an offset value $M_{ofs}$ is defined, for example, using a function $G_2(\ )$:

$$M_{ofs} = G_2(M'_I) \tag{13}$$

As in equations (14), the three-phase conversion unit 42 adds the offset value $M_{ofs}$ to each of the three-phase modulation factor commands ($M_U$, $M_V$, $M_W$) obtained in equations (8) to determine corrected three-phase modulation factor commands ($M'_U$, $M'_V$, $M'_W$):

$$M'_U = M_U + \text{sign}(M_U) \cdot M_{ofs}$$

$$M'_V = M_V + \text{sign}(M_V) \cdot M_{ofs}$$

$$M'_W = M_W + \text{sign}(M_W) \cdot M_{ofs} \tag{14}$$

As necessary, the three-phase conversion unit 42 limits each of the three-phase modulation factor commands ($M'_U$, $M'_V$, $M'_W$) with the maximum and minimum values of a carrier signal to determine the modulation wave commands ($PWM_U$, $PWM_V$, $PWM_W$). The calculations may be simplified by expressing the function $G_2(\ )$ as a table.

Thus, field-weakening control can be properly performed without degrading the response of the field-weakening control unit 4.

Figure 8:
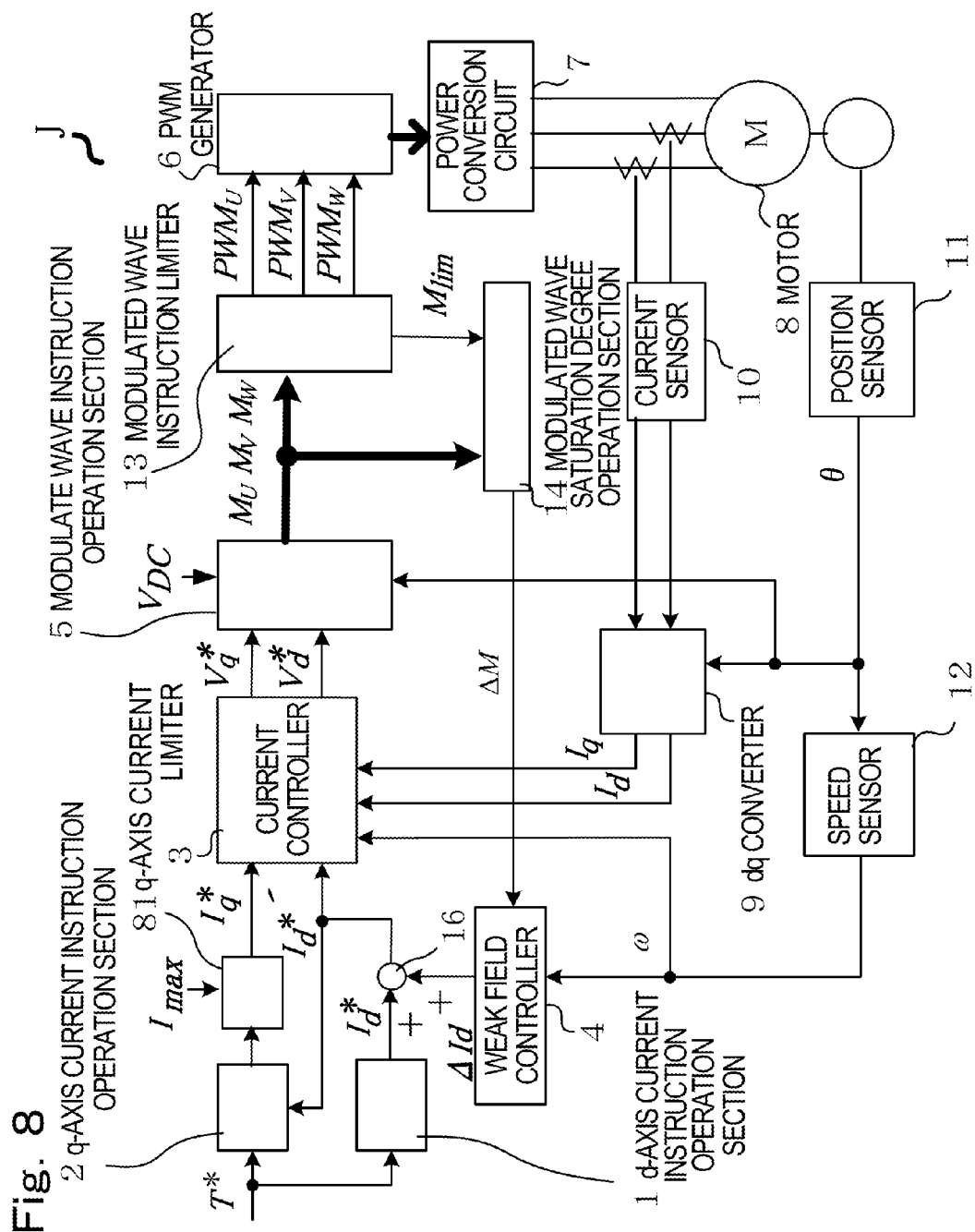
FIG. 8 is a block diagram of a motor control apparatus according to a fifth embodiment of the present invention.

FIG. 8 is a block diagram of a motor control apparatus J according to a fifth embodiment of the present invention.

The motor control apparatus J is obtained by adding a q-axis current command limiting unit 81 to the motor control apparatus I of FIG. 1. The q-axis current command limiting unit 81 uses a current limit value $I_{max}$ and a corrected q-axis current command $I_q^{*\prime}$ to limit the q-axis current command $I_q^*$ output from the q-axis current command calculating unit 2 to determine a new q-axis current command $I_q^*$.

Generally, a motor control apparatus sets a current limit to prevent circuit breakage etc. caused by heat generated, for example, by a power conversion circuit element included in the apparatus. In a motor control apparatus that performs field-weakening control, since an output voltage is determined by a d-axis current, it is important to limit a q-axis current on the basis of the d-axis current.

By using the current limit value $I_{max}$ and the corrected d-axis current command $I_d^{*\prime}$ to determine a q-axis current limit value $I_{qlimit}$, for example, in equation (15), and limiting the q-axis current command $I_q^*$, a composite current of dq-axis currents can be limited to the current limit value $I_{max}$:

$$I_{qlimit} = \sqrt{I_{max}^2 - I_d^{*2}} \tag{15}$$

This limits the generated torque, but makes it possible to reliably prevent circuit breakage etc. caused by overcurrent.

Figure 9:
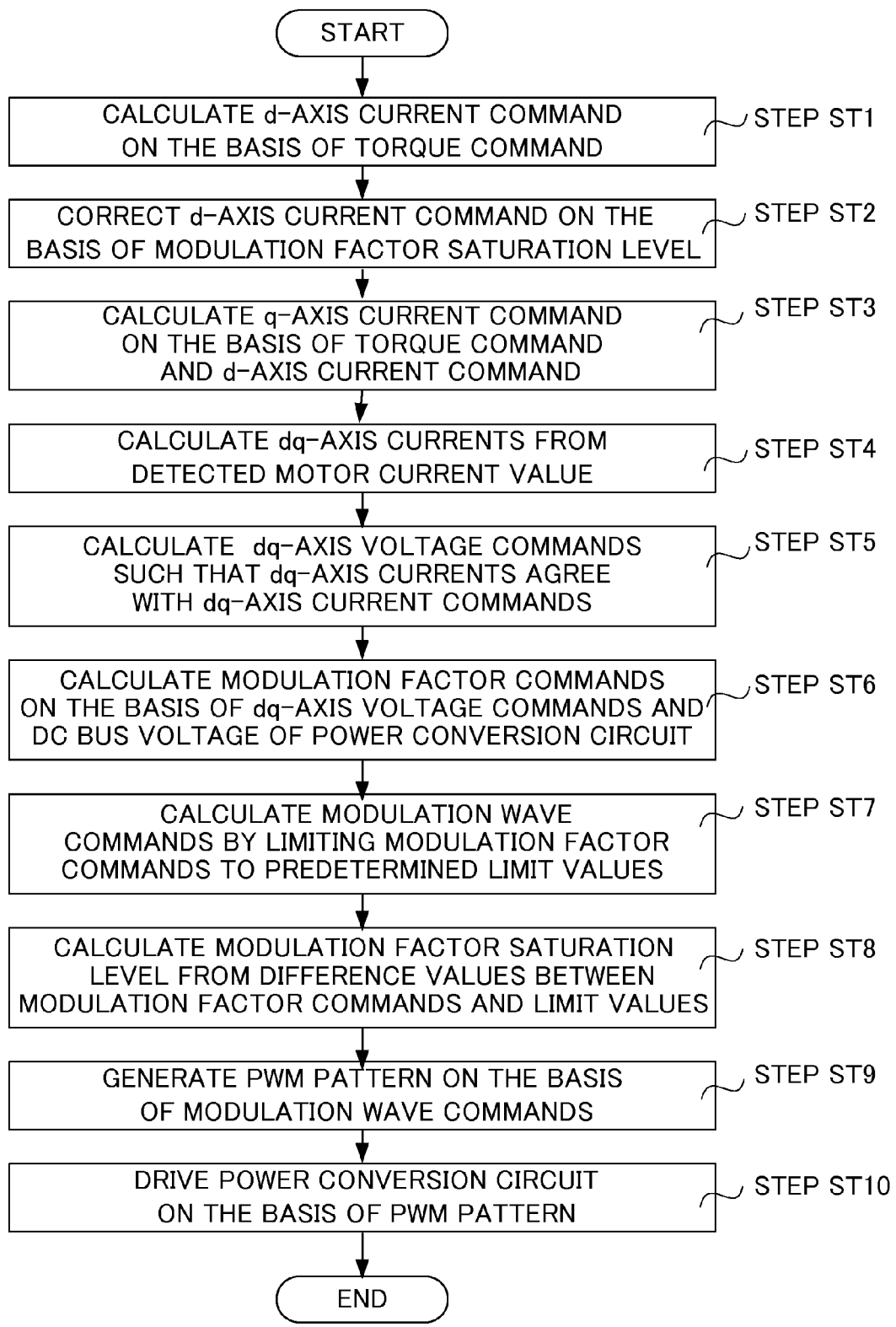
FIG. 9 is a flowchart showing a motor control method according to a sixth embodiment of the present invention.

FIG. 9 is a flowchart showing a method for controlling a motor control apparatus according to a sixth embodiment of the present invention. Each processing step will now be described in sequence.

In step ST1, a given torque command $T^*$ is input to calculate a d-axis current command $I_d^*$ based on motor characteristics.

In step ST2, the d-axis current command $I_d^*$ is corrected on the basis of a modulation factor saturation level $\Delta M$ (described below) to obtain a d-axis current command $I_d^{*\prime}$.

In step ST3, a q-axis current command $I_q^*$ is calculated on the basis of the torque command $T^*$ and the d-axis current command $I_d^{*\prime}$.

In step ST4, a motor current is detected to calculate dq-axis currents ($I_d$, $I_q$).

In step ST5, dq-axis voltage commands ($V_d^*$, $V_q^*$) are calculated such that the dq-axis currents ($I_d$, $I_q$) agree with dq-axis current commands ($I_d^{*\prime}$, $I_q^*$).

In step ST6, three-phase modulation factor commands ($M_U$, $M_V$, $M_W$) are calculated on the basis of the dq-axis voltage commands ($V_d^*$, $V_q^*$) and a DC bus voltage $V_{DC}$ of a power conversion circuit.

In step ST7, the three-phase modulation factor commands ($M_U$, $M_V$, $M_W$) are limited to predetermined limit values to calculate modulation wave commands ($PWM_U$, $PWM_V$, $PWM_W$).

In step ST8, a modulation factor saturation level $\Delta M$ is calculated from difference values between the three-phase modulation factor commands ($M_U$, $M_V$, $M_W$) and their corresponding limit values.

In step ST9, a PWM pattern is generated on the basis of the modulation wave commands ($PWM_U$, $PWM_V$, $PWM_W$).

In step ST10, a motor is driven through a power conversion circuit on the basis of the PWM pattern.

Specific details of each step will not be described here, as they have been described in the first to fifth embodiments above. The sixth embodiment is performed as described above, but the order of processing is not limited to that described above.

Although the present specification describes an IPMSM as an example, an SPMSM differs from the IPMSM only in terms of a relationship between a torque and a current command. Therefore, by applying the embodiments of the present invention to the SPMSM, it is possible to reduce current by performing field-weakening control at the time of output voltage saturation and provide higher-efficiency operation, as compared to before.

Additionally, when, as a flux control method for controlling an induction motor that performs vector control, the present method described above is used to control a field current, it is possible to improve the voltage utilization rate and produce higher torque than before.

Obviously, numerous modifications and variations of the present invention are possible in light of the above teachings. It is therefore to be understood that within the scope of the

What is claimed as new and is desired to be secured by Letters Patent of the United States is:

1. A motor control apparatus comprising:
a current control unit configured to calculate dq-axis voltage commands in a dq coordinate system based on a motor magnetic pole position to match a d-axis current command and a q-axis current command obtained based on a torque command with a d-axis current and a q-axis current of a motor current, respectively;
a power conversion circuit configured to drive the motor based on the dq-axis voltage commands;
a modulation factor command unit configured to determine a modulation factor command based on the dq-axis voltage commands and a direct current bus voltage of the power conversion circuit;
a modulation wave command unit configured to determine modulation wave commands using the modulation factor command;
a pulse width modulation generating unit configured to generate a pulse width modulation pattern based on the modulation wave commands and a pulse width modulation carrier signal;
a modulation factor saturation level calculating unit configured to determine a modulation factor saturation level based on the modulation factor command and a limit value; and
a field-weakening control unit configured to correct the d-axis current command based on the modulation factor saturation level.

2. The motor control apparatus according to claim 1, wherein the modulation factor command unit comprises
a converting unit configured to convert the modulation factor command into a modulation factor command for each of motor output phases, and
an adder configured to add the motor magnetic pole position to a voltage phase of the dq-axis voltage commands to determine an output phase,
wherein the modulation wave command unit comprises
a limiting unit configured to limit the modulation factor command to a value between a maximum value and a minimum value of the pulse width modulation carrier signal; and
wherein the modulation factor saturation level calculating unit comprises
a subtracter configured to determine each of modulation wave difference values using the modulation factor command and the maximum and minimum values, and
a vector synthesizing unit configured to vector-synthesize the modulation wave difference values to determine the modulation factor saturation level.

3. The motor control apparatus according to claim 1, wherein the modulation factor command unit comprises
an adder configured to add the motor magnetic pole position to a voltage phase of the dq-axis voltage commands to determine an output phase,
wherein the modulation wave command unit comprises
a limiting unit configured to limit the modulation factor command to a predetermined modulation factor limit value, and
a converting unit configured to determine a modulation factor command for each of motor output phases using the limited modulation factor command and the output phase, and
wherein the modulation factor saturation level calculating unit comprises
a subtracter configured to subtract the modulation factor limit value from the modulation factor command.

4. The motor control apparatus according to claim 1, wherein the modulation wave command unit comprises
a limiting unit configured to limit the modulation factor command to a predetermined modulation factor limit value,
a dq modulation factor command unit configured to determine dq-axis modulation factor commands using the limited modulation factor command and the dq-axis voltage commands, and
a converting unit configured to determine a modulation factor command for each of motor output phases using the dq-axis modulation factor commands, and
wherein the modulation factor saturation level calculating unit comprises
a subtracter configured to subtract the modulation factor limit value from the modulation factor command.

5. The motor control apparatus according to claim 3, wherein the modulation wave command unit comprises an overmodulation correcting unit configured to correct at least one of the modulation factor command and the limited modulation factor command.

6. The motor control apparatus according to claim 4, wherein the modulation wave command unit comprises an overmodulation correcting unit configured to correct at least one of the modulation factor command and the limited modulation factor command.

7. The motor control apparatus according to claim 5, wherein the overmodulation correcting unit is configured to use an inverse function of a relationship between the modulation factor command and an actual modulation factor.

8. The motor control apparatus according to claim 6, wherein the overmodulation correcting unit is configured to use an inverse function of a relationship between the modulation factor command and an actual modulation factor.

9. The motor control apparatus according to claim 5, wherein the overmodulation correcting unit is configured to add an offset value to the modulation factor command.

10. The motor control apparatus according to claim 6, wherein the overmodulation correcting unit is configured to add an offset value to the modulation factor command.

11. The motor control apparatus according to claim 1, wherein the field-weakening control unit comprises
a controller configured to perform at least one of proportional integral control and integral control based on the modulation factor saturation level so as to determine an amount of d-axis current correction, and
a correcting unit configured to correct the d-axis current command with the amount of d-axis current correction.

* * * * *